(12) United States Patent
Li et al.

(10) Patent No.: US 8,918,695 B2
(45) Date of Patent: Dec. 23, 2014

(54) METHODS AND APPARATUS FOR EARLY STOP ALGORITHM OF TURBO DECODING

(75) Inventors: Yuan Li, San Diego, CA (US); Jianbin Zhu, Poway, CA (US); Tao Zhang, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 12/973,951

(22) Filed: Dec. 21, 2010

(65) Prior Publication Data

US 2011/0154156 A1  Jun. 23, 2011

Related U.S. Application Data

(60) Provisional application No. 61/289,958, filed on Dec. 23, 2009, provisional application No. 61/292,801, filed on Jan. 6, 2010, provisional application No. 61/289,921, filed on Dec. 23, 2009, provisional application No. 61/301,046, filed on Feb. 3, 2010.

(51) Int. Cl.
*H03M 13/00* (2006.01)
*H04L 1/00* (2006.01)

(52) U.S. Cl.
CPC ............... *H04L 1/005* (2013.01); *H04L 1/006* (2013.01)
USPC .................................................. 714/757

(58) Field of Classification Search
CPC ... H04L 1/005; H04L 1/0041; H03M 13/2975
USPC ............................................. 714/757
See application file for complete search history.

(56) References Cited

U.S. PATENT DOCUMENTS

| | | | | |
|---|---|---|---|---|
| 5,761,248 | A * | 6/1998 | Hagenauer et al. | 375/340 |
| 6,578,892 | B2 * | 6/2003 | Tsimmerman | 294/67.21 |
| 6,594,792 | B1 | 7/2003 | Hladik et al. | |
| 6,675,342 | B1 * | 1/2004 | Yagyu | 714/755 |
| 6,686,853 | B2 * | 2/2004 | Shen et al. | 341/50 |
| 6,693,566 | B2 * | 2/2004 | Jaffe et al. | 341/50 |
| 6,708,948 | B2 * | 3/2004 | Nosel | 251/288 |
| 6,718,504 | B1 | 4/2004 | Coombs et al. | |
| 6,738,948 | B2 * | 5/2004 | Dinc et al. | 714/794 |
| 6,745,352 | B2 * | 6/2004 | Cheng | 714/704 |
| 6,898,254 | B2 * | 5/2005 | Wolf et al. | 375/340 |
| 6,982,659 | B2 * | 1/2006 | Shen et al. | 341/50 |
| 6,993,704 | B2 | 1/2006 | Wolf | |
| 7,185,260 | B2 | 2/2007 | Coombs et al. | |
| 7,200,799 | B2 | 4/2007 | Wang et al. | |
| 7,242,726 | B2 * | 7/2007 | Cameron et al. | 375/295 |
| 7,254,190 | B2 * | 8/2007 | Kwentus et al. | 375/340 |
| 7,260,766 | B2 * | 8/2007 | Levy et al. | 714/780 |
| 7,331,012 | B2 * | 2/2008 | Vasic et al. | 714/781 |
| 7,657,819 | B2 * | 2/2010 | Berkmann et al. | 714/755 |

(Continued)

OTHER PUBLICATIONS

Kim et al., IEEE Transactions on Circuits and Systems "Double-Binary Circular Turbo Decoding Based on Border Metric Encoding", vol. 55, No. 1, Jan. 2008, pp. 79-83.

*Primary Examiner* — Amine Riad

(57) ABSTRACT

Methods and apparatus for early stop algorithm of turbo decoding are disclosed. An example method comprises of combination of comparing of hard decisions of soft outputs of the current iteration and the previous iteration and comparing the minimum log likelihood results against a threshold. The decoding iteration is stopped once the hard decisions are matched and the minimum soft decoding result exceeds a threshold.

3 Claims, 5 Drawing Sheets

(56) References Cited

U.S. PATENT DOCUMENTS

| | | | |
|---|---|---|---|
| 7,849,377 B2* | 12/2010 | Hekstra et al. | 714/752 |
| 8,250,448 B1 | 8/2012 | Andrews | |
| 8,341,506 B2* | 12/2012 | Li et al. | 714/780 |
| 8,468,428 B1* | 6/2013 | Matache | 714/780 |
| 2002/0184596 A1* | 12/2002 | Dinc et al. | 714/794 |
| 2005/0022101 A1* | 1/2005 | Malm et al. | 714/801 |
| 2006/0158568 A1* | 7/2006 | Kaylani et al. | 348/725 |
| 2007/0061666 A1 | 3/2007 | Nakai | |
| 2007/0067703 A1* | 3/2007 | Berkmann et al. | 714/794 |
| 2007/0101231 A1 | 5/2007 | Kutz et al. | |
| 2007/0234180 A1 | 10/2007 | Edmonston et al. | |
| 2008/0092010 A1 | 4/2008 | Orio | |
| 2008/0270868 A1 | 10/2008 | Shinagawa et al. | |
| 2009/0049358 A1* | 2/2009 | Jalloul et al. | 714/752 |
| 2009/0089643 A1* | 4/2009 | Hsieh | 714/755 |
| 2009/0300463 A1 | 12/2009 | Purkovic et al. | |
| 2011/0055657 A1* | 3/2011 | Charpentier et al. | 714/752 |
| 2011/0107019 A1 | 5/2011 | Pan et al. | |
| 2013/0156133 A1 | 6/2013 | Gentile et al. | |
| 2013/0235957 A1* | 9/2013 | El Khamy et al. | 375/341 |
| 2014/0064413 A1* | 3/2014 | Huebner et al. | 375/340 |

* cited by examiner

METHODS AND APPARATUS FOR EARLY STOP ALGORITHM OF TURBO DECODING

RELATED APPLICATIONS

This patent claims priority from U.S. Provisional Application Ser. No. 61/289,958 entitled "A simple and efficient early stop scheme for turbo decoder" which was filed on Dec. 23, 2009; U.S. Provisional Application Ser. No. 61/292,801 entitled "A UMTS turbo decoder with multiple MAP engines" which was filed on Jan. 6, 2010; U.S. Provisional Application Ser. No. 61/289,921 entitled "A method of trellis termination handling in turbo decoder" which was filed on Dec. 23, 2009; and U.S. Provisional Application Ser. No. 61/301,046 entitled "A contention free memory structure and interleaver for parallel HSPA_LTE turbo decoder" which was filed on Feb. 3, 2010. Each of U.S. Provisional Patent Application Ser. Nos. 61/289,958, 61/292,801, 61/289,921 and 61/301,046 is hereby incorporated by reference in its entirety.

FIELD OF THE DISCLOSURE

This disclosure relates generally to receivers for communication systems, and, more particularly, to methods and apparatus to perform turbo decoding for communications receivers.

BACKGROUND

Communications Systems widely adopt error correction coding techniques to combat with error introduced by interference and noise. FIG. 1 illustrates a typical communication system with error correction techniques which comprises an error correction encoder 100 at transmitter and a decoder 110 at receiver. The class of error control codes, referred to as turbo codes, offers significant coding gain for power limited communications channels.

Turbo codes are decoded by iterative decoding algorithms. It belongs to a family of iterative decoding algorithms applicable to LDPC code, turbo product code, parallel concatenated convolutional code, serial concatenated convolutional code and etc. During each iteration, the decoder improves the reliability of the information bits. In order to reach a sufficient decoding performance, usually a fixed number of iteration is used. However, in many cases, the correct decoding results can be generated with only a few iterations. Excessive iteration does not help to improve the performance further and only consumes extra power which is a critical resource in mobile devices.

Many early stop algorithms have been proposed to reduce the power consumption for turbo decoding. These algorithm claims to have good performance but these studies did not looked into practical scenarios where the code rate is high. For example, a hard-decision comparison based algorithm has been proposed in [1]. This algorithm compares hard-decisions of information bits from the current iteration and that of the previous iteration. The decoding is stopped once the hard-decisions from the previous iteration matches with those of the current iteration. This algorithm introduces large performance loss in high SNR channel conditions especially with the combination of high code rate. This made the algorithm difficult to be implemented into a practical communication system since the practical communication system like HSDPA usually applies high code rate when signal to noise ration is sufficient. Another early stop algorithm [1] has been proposed which computes the minimum log likelihood ratio (LLR) of decoded output bits. If the minimum value of LLR of all bits exceeds the certain threshold, the decoding is stopped. However, a large block error rate (BLER) performance loss is reported when channel SNR is high. Among various early stop algorithms proposed, no sufficient investigation in the literature has been found to explore the relationship between the BLER performance loss and code rate.

[1] A. Matache, S. Dolinar and F. Pollara, "Stopping Rules for Turbo Decoders", TMO Progress Report 42-142, Jet Propulsion Laboratory, Aug. 15, 2000.

DETAILED DESCRIPTION

Figure 1:
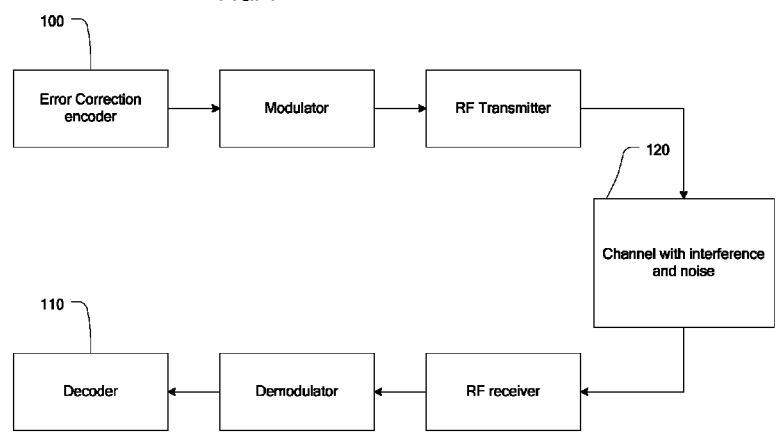
FIG. 1 is a communications system with error correction coding.
Figure 2:
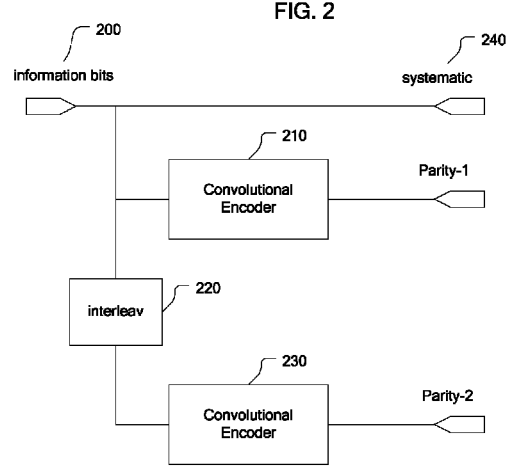
FIG. 2 is a block diagram of turbo code.

As illustrated in FIG. 2, turbo codes consist of two constituent recursive convolutional codes. The information bits are first encoded by a recursive systematic convolutional encoder 210, and the interleaved version 220 of the information bits are encoded again by the same type of convolutional encoder 230. The resultant parity bits of the first encoder, the second encoder and the systematic information bits itself are transmitted over the communications channels.

Figure 3:
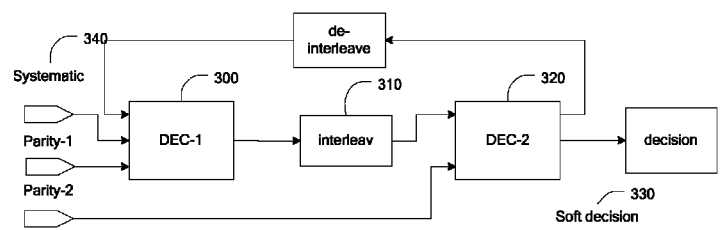
FIG. 3 illustrates an iteration decoding algorithm for turbo codes.

The decoding algorithm of turbo codes is known as iterative decoding algorithm. The block diagram of an example iterative decoding algorithm is illustrated in FIG. 3. In a decoding iteration, two soft-input, soft-output decoders are employed. The output of the first decoder 300 is feed into the second decoder as input after interleaving. Similarly, the output of the second decoder 320 is feed into the first decoder as input. A decoding iteration is completed by passing information once between the DEC-1 300 to DEC-2 320 and DEC-2 320 to DEC-1 310. For each soft-input soft-output decoder, the MAP decoding algorithms which generates maximum a posterior probability of the information bits are usually used. The MAP decoder takes soft input of systematic bits, and parity bits. It computes the soft-output of the systematic bits using the trellis structure of the convolutional code. The soft-output is called a posterior information. At the same time, the extrinsic information is also calculated which is defined as the contribution of information from the current decoding process alone. The extrinsic information is de-interleaved before passing to the next decoding stage. In the next decoding stage, the extrinsic information is utilized as a priori information of the systematic bits and added together with the systematic information bits before decoding. This type of iteration is repeated multiple times before the final results are given as the output. To achieve a good performance of turbo decoding, multiple decoding iterations are required. But the number of iteration depends on the signal to noise ratio (SNR) of the channel. In a low SNR scenario, more iteration, typically 8 to 16 is usually required. However, in high SNR scenarios, the number of iteration can be largely reduced.

In cellular communication systems, the turbo code is adopted for many standards. The WCDMA standard, the CDMA2000 standard and the WiMAX standard have adopted turbo code as forward error correction techniques. In the case of mobile devices which usually powered by batteries, the power consumption is an important factor. For high data rate communication applications, the turbo decoder consumes significant percentage of total amount of power of a mobile device. Therefore, reducing power consumption by early stopping the turbo decoding iterations without error rate performance degradation is critical.

Figure 4:
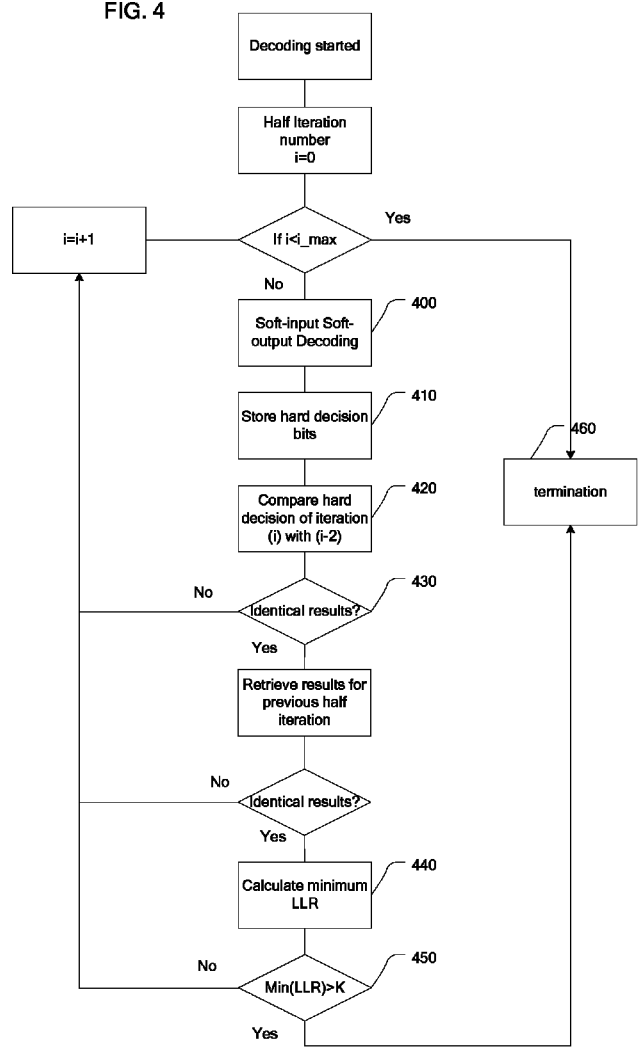
FIG. 4 illustrates the early stop algorithm invented.

In this disclosure, a new algorithm is proposed to reduce the number of iterations without observable performance loss in BLER. This algorithm as illustrated in FIG. 4 is a combination of the following two approaches.

For each half iteration number (i), the hard-decisions are stored and compared with the hard-decisions from the previous iteration (i−2). No comparison is performed between two consecutive half iterations due to the fact that these information bits are generated in the interleaved order. For two consecutive half iterations (i) and (i+1), if both of them have matched hard-decisions with their previous iteration results respectively, i.e., half iteration (i) matched with (i−2) and half iteration (i−1) matched with (i−3). The first stop criterion is met. This stop criterion is found to perform well in low code rate but showing significant performance loss in high code since no sufficient extrinsic information is provided from highly punctured parity bits therefore hard decision may not change between consecutive iterations.

The minimum log likelihood ratio (LLR) of all output bits are computed and compared with a threshold K. If the minimum reliability of the output bits exceeds the threshold K. Then the second stop criterion is met. This stop criterion is found to provide limited performance in high SNR scenario but is good in high code rate cases.

For each half iteration, the decoding is stopped when both stop criterions are met therefore.

Extensive computer simulation has been performed to check the performance of the disclosed algorithm to cover different code rate from ⅓ to 0.99 and different code block sizes. Using the first stopping criteria alone, the BLER performance does not degrade in the low code rate but significant performance loss observed in high code rate. Using the second stopping criteria alone, the BLER performance degradation is significant especially when code rate is low. However, combining these two stopping criteria, the BLER performance loss becomes none observable in any code rate.

Figure 5:
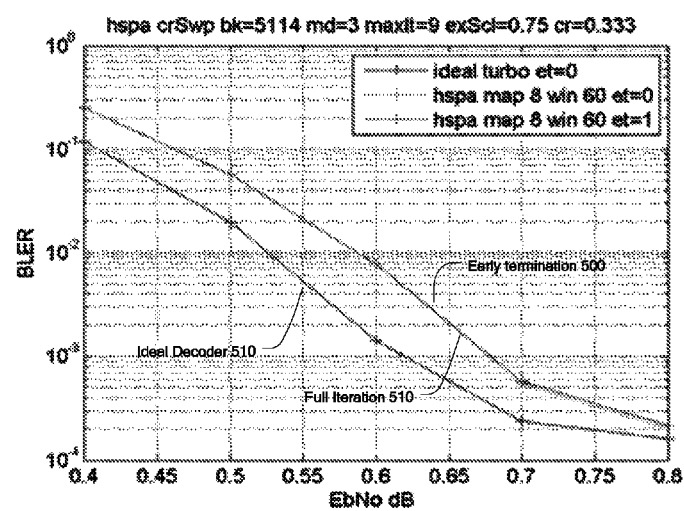
FIG. 5 illustrates the performance of early stop algorithm in low code rate.
Figure 6:
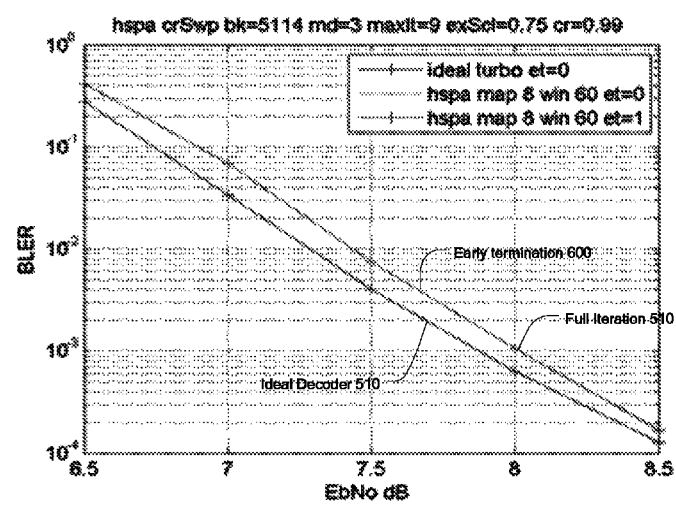
FIG. 6 illustrates the performance of early stop algorithm in high code rate.

Computer simulation results are given for the disclosed algorithm. The performance loss of BLER is illustrated in FIG. 5 when code rate is low, i.e., r=0.33 and code block size=5114. The performance loss of BLER is illustrated in FIG. 6 when code rate is high, i.e., r=0.98 and code block size=5114. Both cases showing excellent BLER performance of the disclosed algorithm.

What is claimed is:

1. A method comprising:
   decoding received signal sequence, by a decoder module comprising a first soft-input, soft-output decoder and a second soft-input, soft-output decoder, using an iterative decoding process which aborts the decoding when a combination of two criterions is met, wherein each decoding iteration includes two consecutive half iterations wherein a first half iteration comprises decoding by the first decoder and the second half iteration comprises decoding by the second decoder, wherein output of the first decoder is fed as an input into the second decoder and output of the second decoder is fed as an input into the first decoder,
   determining whether the first criterion is met by determining whether hard decisions of decoder output bits from first half iteration of a current decoding iteration are identical to hard decisions decoder of decoder output bits from a first half iteration of a previous decoding iteration and whether hard decisions of decoder output bits of a second half iteration of the current decoding iteration are identical to hard decisions of decoder output bits from a second half iteration of the previous decoding iteration, and
   determining whether a second criterion is met by determining whether a minimum value of log likelihood ratio of output decoded bits of a current decoding iteration is greater than a threshold.

2. A method according to claim 1, wherein said decoder module is used for one of parallel concatenated convolutional codes and turbo codes.

3. A method according to claim 1, wherein said decoder module is used for one of WCDMA and HSDPA cellular systems defined by 3GPP standards.

* * * * *